UNITED STATES PATENT OFFICE.

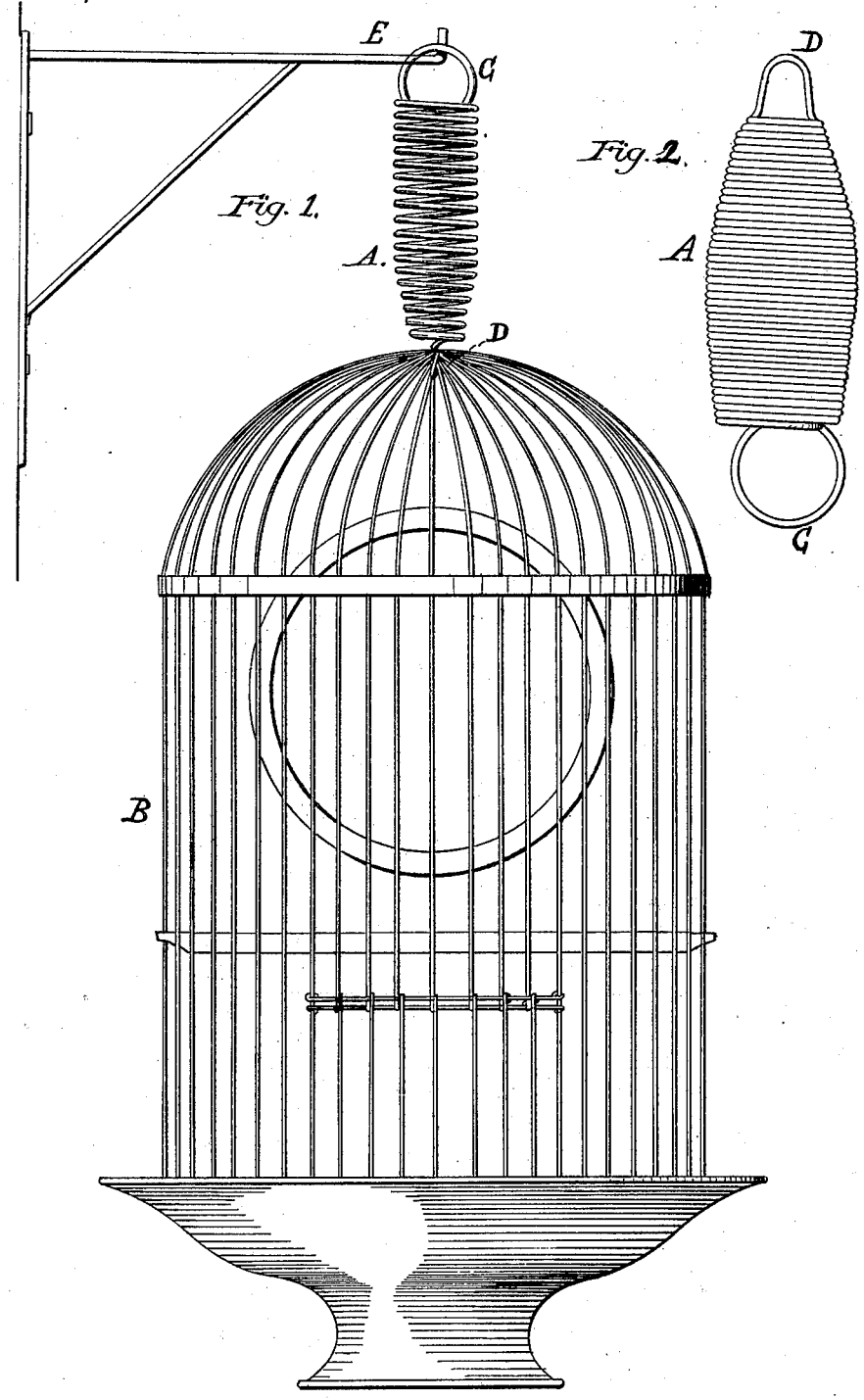

GEORGE W. FULLER, OF BOSTON, MASSACHUSETTS, ASSIGNOR OF ONE-HALF HIS RIGHT TO JOHN B. FITZPATRICK, OF SAME PLACE; SAID GEORGE W. FULLER AND JOHN B. FITZPATRICK ASSIGNORS OF ONE-HALF EACH OF THEIR RIGHTS TO JOHN McCLARY PERKINS, OF WASHINGTON, D. C.

IMPROVEMENT IN HANGING BIRD-CAGES.

Specification forming part of Letters Patent No. 170,845, dated December 7, 1875; application filed April 7, 1875.

*To all whom it may concern:*

Be it known that I, GEORGE W. FULLER, of the city of Boston, in the county of Suffolk and State of Massachusetts, have invented certain new and useful Improvements in Bird-Cages; and I do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claims.

The object of my invention is to furnish a bird-cage which will give to the bird as it alights on the perches within the cage that easy, graceful motion so generally observed and admired in wild birds of song as they move from bough to bough in the forest.

Hitherto no invention has attained this result.

I am aware that a single perch fastened to the cage from the inside has been patented; but this contrivance soon gets out of order. It also disfigures the cage. The bird must seek this particular perch in order to enjoy the luxury of this feature of its forest life.

After much thought and study, I have invented a simple and durable device, which transmutes the whole bird-cage, with its perches, into a forest with its swinging boughs.

Figure 1 shows the bird-cage B with the helical spring A attached to it, and suspended from the bracket E. Fig. 2 shows the spring A detached from the bird-cage. C is the loop at its upper end, by which it is suspended. D is the hook or catch by which it is fastened to the cage. The spring A is made of a single piece of steel or brass wire, coiled and shaped as shown in the accompanying drawings.

I make no claim to novelty in the spring A. I well know that such a spring, in various forms, has been used for a multitude of purposes since the time "when the memory of man runneth not to the contrary."

I disclaim any novelty or invention of this element of my invention, except when applied to a bird-cage. As I am the first inventor who has applied this device to a bird-cage to produce the result before described, I claim protection under the patent laws of the United States, not only for this particular method, but also for any equivalent which substantially accomplishes the same object.

Having now fully described my invention, what I claim, and desire to secure by Letters Patent, is—

1. The method herein described of rendering a bird-cage elastic, or of giving it an oscillating or undulating motion, consisting in suspending the same from an elastic medium, substantially as described, and for the purposes set forth.

2. A helical suspension-spring, in combination with a bird-cage, substantially as shown and described, and for the purposes set forth.

GEORGE W. FULLER.

Witnesses:
ANDREW H. BRIGGS,
CHARLES E. TOWNSEND.